US009784389B2

(12) United States Patent
Fukano et al.

(10) Patent No.: US 9,784,389 B2
(45) Date of Patent: Oct. 10, 2017

(54) PIPE JOINT (75) Inventors: Yoshihiro Fukano, Moriya (JP);
Tadashi Uchino, Moriya (JP)

(73) Assignee: SMC KABUSHIKI KAISHA, Tokyo (JP)

( * ) Notice: Subject to any disclaimer, the term of this patent is extended or adjusted under 35 U.S.C. 154(b) by 1070 days.

(21) Appl. No.: 13/608,070

(22) Filed: Sep. 10, 2012

(65) Prior Publication Data

US 2013/0147183 A1    Jun. 13, 2013

(30) Foreign Application Priority Data

Dec. 12, 2011   (JP) .................... 2011-270762

(51) Int. Cl.
*F16L 47/04*   (2006.01)
*F16L 19/028*  (2006.01)

(52) U.S. Cl.
CPC ........... *F16L 19/0283* (2013.01); *F16L 47/04* (2013.01); *F16L 2201/10* (2013.01)

(58) Field of Classification Search
USPC .................. 285/93, 242, 245–247, 353–354, 285/384–387, 389, 423, 919
See application file for complete search history.

(56) References Cited

U.S. PATENT DOCUMENTS

| 1,189,656 A | * | 7/1916 | Bohle ......................... 411/198 |
| 1,894,700 A | * | 1/1933 | Parker ................. F16L 19/046 277/622 |
| 2,227,105 A | * | 12/1940 | Pritchard ............ F16L 27/0816 111/7.1 |

(Continued)

FOREIGN PATENT DOCUMENTS

GB    2264762 A  *  9/1993  ............ F16L 19/083
JP    63-145089 U     9/1988

(Continued)

OTHER PUBLICATIONS

Notice of Allowance issued Jun. 17, 2014, in Korean Patent Application No. 10-2012-0104946 with English translation of pertinent portion.
Korean Office Action issued Nov. 1, 2013 in Patent Application No. 10-2012-0104946 with Partial English Translation.

(Continued)

*Primary Examiner* — Aaron Dunwoody
*Assistant Examiner* — Fannie Kee
(74) *Attorney, Agent, or Firm* — Oblon, McClelland, Maier & Neustadt, L.L.P.

(57) ABSTRACT

A pipe joint contains a body having a fluid passage in the interior thereof, a tightening cap screw-engaged with an end of the body for connecting a tube thereto, and an indicator ring interposed between a stopper of the body and an end of the tightening cap. The indicator ring is equipped with a flat section and an inclined section, which is inclined with respect to the flat section, and is formed with a smaller diameter than an outer circumferential surface of the tightening cap. When the tightening cap is screw-rotated to thereby connect the tube, as a result of the inclined section being pressed and deformed by movement of the tightening cap, the inclined section projects radially outward with respect to the outer circumferential surface of the tightening cap, whereby a tightened condition is visually confirmed by the outer edge of the indicator ring.

10 Claims, 10 Drawing Sheets

(56) References Cited

U.S. PATENT DOCUMENTS

| | | | | |
|---|---|---|---|---|
| 2,354,538 | A * | 7/1944 | Parker | F16L 27/1008 277/624 |
| 2,988,385 | A * | 6/1961 | Foelester | F16L 43/001 285/179 |
| 3,287,813 | A * | 11/1966 | Lennon | G01B 3/42 285/93 |
| 3,942,570 | A * | 3/1976 | Bochman et al. | 411/220 |
| 4,475,748 | A * | 10/1984 | Ekman | F16L 19/0206 285/12 |
| 4,919,455 | A * | 4/1990 | Yoshiro | 285/23 |
| 5,280,967 | A * | 1/1994 | Varrin, Jr. | 285/93 |
| 5,340,163 | A * | 8/1994 | Merrer et al. | 285/93 |
| 6,640,457 | B2 * | 11/2003 | Williams et al. | 33/501.45 |
| 7,240,925 | B2 * | 7/2007 | Fukano | F16L 47/04 285/243 |
| 2005/0097763 | A1 * | 5/2005 | Williams | F16L 19/00 33/501.45 |
| 2010/0213705 | A1 * | 8/2010 | Williams | F16L 19/103 285/332.3 |

FOREIGN PATENT DOCUMENTS

| | | |
|---|---|---|
| JP | 3-59586 U | 6/1991 |
| JP | 3656752 | 3/2005 |
| JP | 2010-216492 A | 9/2010 |
| JP | 4790035 | 7/2011 |

OTHER PUBLICATIONS

Office Action issued Aug. 5, 2013 in German Patent Application No. 10 2012 019 316.5.

* cited by examiner

PIPE JOINT

CROSS-REFERENCE TO RELATED APPLICATION

This application is based upon and claims the benefit of priority from Japanese Patent Application No. 2011-270762 filed on Dec. 12, 2011, of which the contents are incorporated herein by reference.

BACKGROUND OF THE INVENTION

Field of the Invention

The present invention relates to a pipe joint, for example, for connecting fluid inlet and outlet tubes.

Description of the Related Art

Heretofore, pipe joints have been used for connecting fluid tubes to a fluid pressure device. In such a pipe joint, for example, as disclosed in Japanese Patent No. 3656752, after a tube has been inserted into an end of a joint main body, a nut member is gradually moved toward a central portion of a joint member by moving and screw-rotating the nut member along the tube toward the side of the joint main body, and the nut member is screw-rotated toward a displacement end position by abutment thereof against a ring member. As a result, a condition is brought about in which the tube is connected completely with respect to the joint main body which constitutes the pipe joint.

With a pipe joint constructed in this manner, by moving (screw-rotating) the nut member and by abutment thereof against the ring member, a condition is brought about in which the tube is reliably connected without leakage with respect to the joint member. However, it is difficult for an operator to visually confirm the abutment condition (connection condition) and such a confirmation operation can be performed only by judging whether or not the nut member has been moved into abutment with the ring member.

For this reason, it is extremely difficult to confirm connection of the tube with respect to the pipe joint, and in the case that a different operator attempts to confirm a connection operation that has already been performed by one operator who previously confirmed connection of the tube with respect to the pipe joint, then the same confirmation operation has to be repeated, which is troublesome.

Thus, as disclosed in Japanese Patent No. 4790035, a pipe joint is known, which is capable of enabling confirmation of a tube connection by means of the nut member itself.

With this pipe joint, a ring member is gripped between an end of the nut member and a peripheral flange that projects from an outer circumferential surface of the joint main body. On the ring member, an end surface thereof facing the peripheral flange is formed as a tapered surface, which gradually becomes inclined toward an inner circumference side and one side of the nut member.

In addition, in a state in which the nut member is separated from the peripheral flange of the joint main body, the ring member is accommodated between ends of the nut member and the peripheral flange without projecting outside beyond the outer circumferential surface of the peripheral flange. On the other hand, by screw-rotating the nut member and moving the end thereof toward the side of the peripheral flange, the ring member is pressed in an axial direction by the end, whereby the tapered surface moves gradually in a radial outward direction by abutment thereof against the peripheral flange, so that the tapered surface projects outside with respect to the outer circumferential surface of the peripheral flange. Owing thereto, the state of connection of the tube by the nut member can be confirmed by the projection of the ring member that projects with respect to the peripheral flange.

SUMMARY OF THE INVENTION

However, with the pipe joint of the aforementioned Japanese Patent No. 4790035, there is a concern that, in the case that frictional resistance is too large at the contact region between the tapered surface and the peripheral flange, as a result of restricting movement of the nut member in the axial direction, connection of the tube cannot be carried out completely by screw-rotating the nut member. As a result, connection of the tube with respect to the pipe joint may be incomplete, and leakage of fluid that flows through the interior of the tube might occur.

A general object of the present invention is to provide a pipe joint, which easily and reliably enables confirmation of the state of connection of a tube from the exterior, and which is capable of securely connecting the tube with respect to a body.

The present invention is a pipe joint comprising a body having a flow passage in the interior thereof through which a fluid flows, a tightening member screw-engaged for advancing and retracting movement on an end of the body for connecting a tube, through which the fluid flow, to the end, and a visual confirmation ring interposed between an end of the tightening member and the body, the visual confirmation ring becoming exposed to the exterior with respect to the tightening member at a time that the tube is tightened by the tightening member, wherein the visual confirmation ring is elastically deformable, and is deformed so that an outer edge thereof is expanded in diameter by being gripped between the tightening member and the body upon movement of the tightening member.

According to the present invention, the visual confirmation ring, which is exposed to the outside with respect to the tightening member at a time of being tightened by the tightening member, is disposed between the tightening member and the body having a flow passage therein. The tightening member serves to connect the tube to the end of the body. Additionally, when the tube is connected to the body, the tightening member, which can be advanced and retracted on the end of the body, moves toward the side of the visual confirmation ring, whereupon the tightening member presses and deforms the visual confirmation ring, so that the outer edge of the visual confirmation ring becomes exposed outside with respect to the tightening member. Consequently, since the tightened state of the tightening member with respect to the body can easily and reliably be confirmed visually by observing the outer edge of the visual confirmation ring, it can easily and reliably be confirmed whether or not the tube has been connected by the tightening member reliably, along with reliably preventing leakage of fluid from between the body and the tube. Further, since the state of connection between the tube and the body can easily be confirmed, the assembly operation can be enhanced when the tube is connected through the tightening member.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
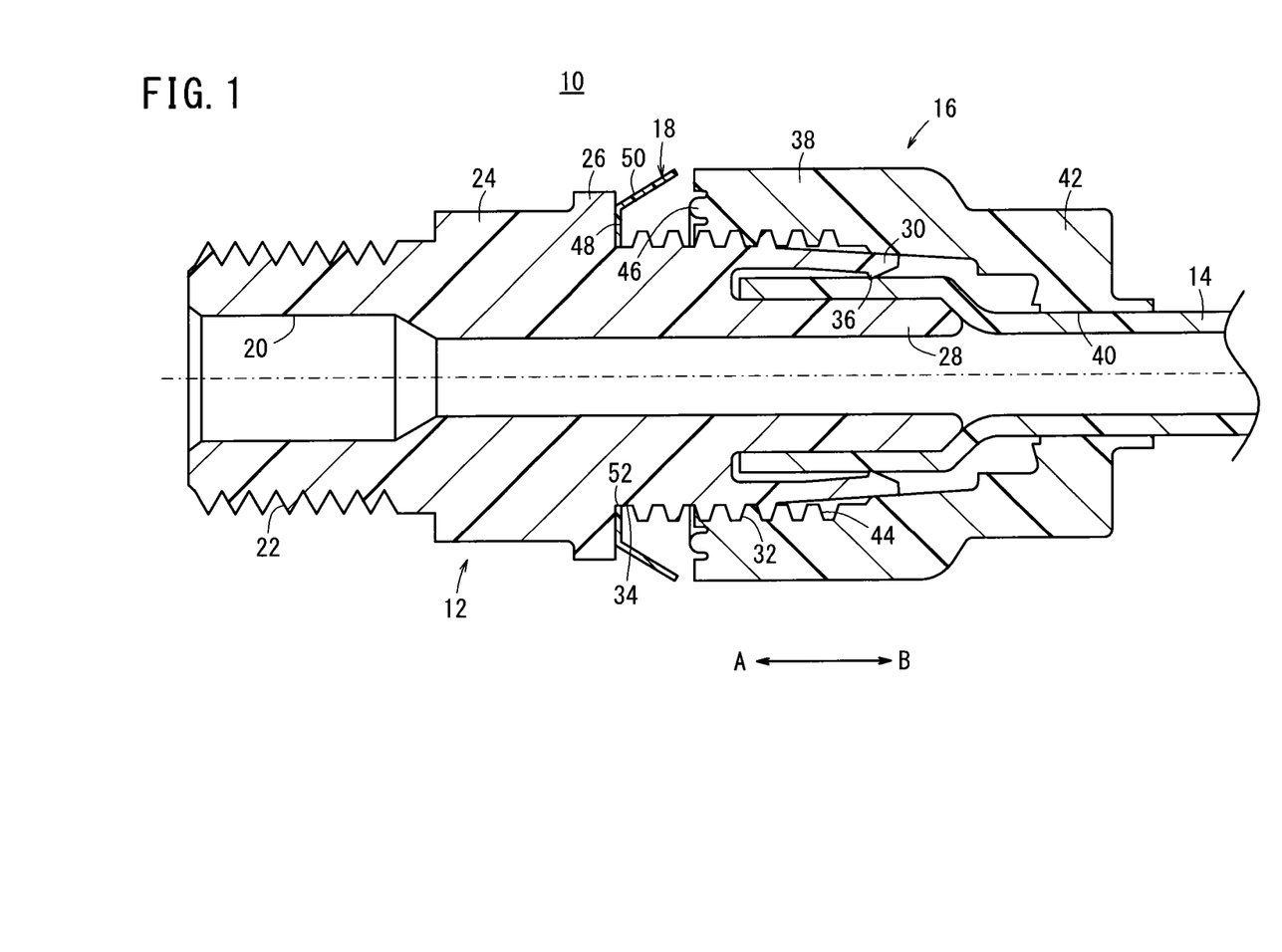
FIG. 1 is an overall vertical cross sectional view showing a state prior to a tightening cap being tightened, in a pipe joint according to a first embodiment of the present invention.

In FIG. 1, reference number 10 designates a pipe joint according to a first embodiment of the present invention. As shown in FIGS. 1 through 5, the pipe joint 10 is equipped with a body 12 formed along a straight line, a tightening cap (tightening member) 16, which is screw-engaged with an end of the body 12 for connecting a tube 14, and an indicator ring (visual confirmation ring) 18 that is gripped between the tightening cap 16 and the body 12. A fluid passage (flow passage) 20, through which a fluid flows in the longitudinal direction (the direction of arrows A and B) of the body 12, is formed in the interior of the body 12. The fluid passage 20 opens respectively on one end and on another end of the body 12, and communicates with the exterior. The tube 14, for example, is formed in a tubular or pipe shape from a resin material or the like.

Screw threads 22 are engraved on the outer circumferential surface on one end of the body 12, which are connected by screw-engagement to the port of a non-illustrated fluid pressure device and the like. A nut member 24, which is hexagonal in cross section, is formed substantially in a center portion of the body 12 adjacent to the screw threads 22. The nut member 24 is grasped by a suitable tool or the like and the body 12 is rotated, whereby the body 12 may be connected to the aforementioned port.

A stopper 26 is formed on an end of the nut member 24, which is expanded radially outward in diameter on the other end side (in the direction of the arrow B) of the body 12. The stopper 26, for example, is formed in an annular shape with a substantially constant diameter.

A guide member 28 over which the tube 14 is externally inserted, a cylindrical latching member 30 provided on an outer circumferential side of the guide member 28, and screw threads 32, which are adjacent to the latching member 30, are provided on the other end of the body 12. An end of the tube 14 is inserted between the guide member 28 and the latching member 30.

The screw threads 32 are formed on an outer circumferential surface of a region that is smaller in diameter than the stopper 26 and larger in diameter than the guide member 28. Further, substantially in the center of the body 12, at a position between the screw threads 32 and the stopper 26, a mounting portion 34 is formed on which the indicator ring 18 is mounted.

The latching member 30 is formed with claws 36 that project in a radial inward direction on an inner circumferential surface of an end thereof on the other end side (in the direction of the arrow B) of the body 12. The claws 36 bite into the outer circumferential surface of the tube 14, thereby restricting displacement of the tube 14 along the axial direction (the direction of arrows A and B).

The tightening cap 16 is made up from a large diameter portion 38 formed in a cylindrical shape in meshed engagement with the other end of the body 12, and a small diameter portion 42 having a tube opening 40 therein through which the tube 14 is inserted. A female screw portion 44 having threads engraved thereon is formed on the inner circumferential surface of the large diameter portion 38. In addition, the tightening cap 16, after having been inserted over the other end of the body 12, is connected to the body 12 by screw engagement with the screw threads 32.

On one end of the large diameter portion 38, an annular protrusion 46 is formed that projects in the axial direction (the direction of the arrow A) from the end portion. The protrusion 46, for example, is semicircular in cross section, such that when the tightening cap 16 is moved (in the direction of the arrow A) toward the side of the stopper 26 of the body 12, the protrusion 46 is capable of coming into abutment with the indicator ring 18 which is disposed therebetween.

Further, as a result of the tightening cap 16 moving toward the side of the stopper 26 of the body 12 (in the direction of the arrow A), the latching member 30 is pressed radially inwardly by the inner circumferential surface of the tightening cap 16, and the claws 36 bite into the outer circumferential surface of the tube 14.

Figure 2:
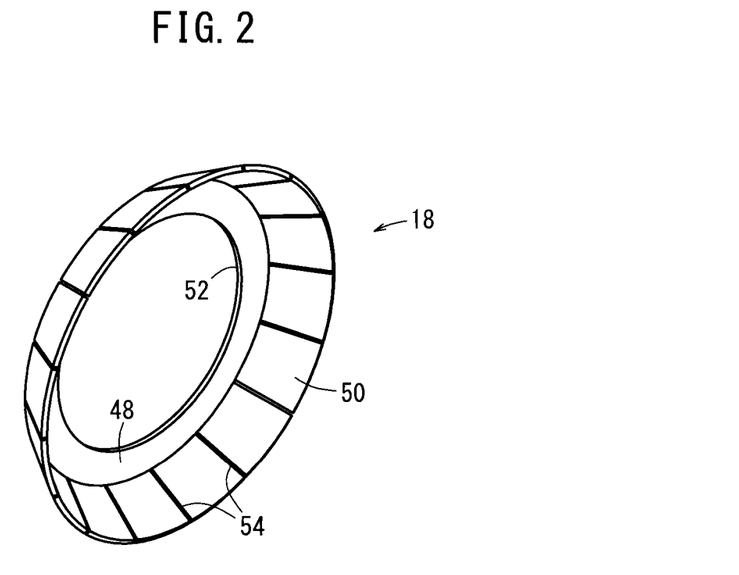
FIG. 2 is an exterior perspective view of an indicator ring that constitutes part of the pipe joint shown in FIG. 1.

The indicator ring 18, for example, is formed from an elastically deformable resin material, and is formed with an annular shape having a substantially constant thickness and a predetermined width in the radial direction. The indicator ring 18 is equipped with a planar annular shaped flat section 48, and an inclined section 50, which is inclined and expands at a predetermined angle with respect to the flat section 48 on an outer edge portion of the flat section 48. An opening 52 is formed in the center of the flat section 48, and the flat section 48 is mounted on the mounting portion 34 by inserting the other end of the body 12 through the opening 52.

Further, the indicator ring 18 may be colored or painted in a red color, an orange color or the like.

The outer diameter of the flat section 48 is set to be smaller than the outer diameter of the stopper 26, for example, when the indicator ring 18 is installed on the body 12.

The inclined section 50 is inclined, for example, at roughly 120 degrees with respect to the flat section 48. A plurality of slits 54 are formed on the inclined section 50, and extend from the outer circumferential side of the inclined section 50 toward the inner circumferential side thereof on the side of the flat section 48. The plurality of slits 54 are separated from each other along the circumferential direction. Further, when the indicator ring 18 is installed on the body 12, the outer diameter of the inclined section 50 is set to be about the same or slightly smaller than the outer diameter of the large diameter portion 38 on the tightening cap 16.

In addition, the indicator ring 18 is inserted onto the body 12 through the opening 52 from the other end of the body 12, and is arranged on the mounting portion 34 between the screw threads 32 and the stopper 26, whereby the flat section 48 thereof abuts against a side surface of the stopper 26, and the inclined section 50 is disposed in a condition of being inclined toward the other end side (in the direction of the arrow B) of the body 12.

The pipe joint 10 according to the first embodiment of the present invention is basically constructed as described above. Next, a case will be explained in which the tube 14 is connected with respect to the body 12. Initially, a preparatory condition will be described in which the tube 14 is not connected with respect to the other end of the body 12, and the tightening cap 16 has not yet been mounted thereon.

At first, in the aforementioned preparatory condition, a non-illustrated operator grasps the indicator ring 18 and inserts the indicator ring 18, via the opening 52 thereof toward the one end side (in the direction of the arrow A) from the other end side of the body 12. At this time, the indicator ring 18 is inserted such that the flat section 48 thereof is arranged on the one end side of the body 12 (in the direction of the arrow A), whereas the inclined section 50 is arranged on the other end side (in the direction of the arrow B) of the body 12.

Additionally, after passing over the outer circumferential sides of the latching member 30 and the screw threads 32, the indicator ring 18 is inserted onto the mounting portion 34, and the flat section 48 comes into abutment against the side surface of the stopper 26. As a result, a condition is brought about in which the flat section 48 of the indicator ring 18 abuts against the side surface of the stopper 26, and the inclined section 50 is mounted on the mounting portion 34 so as to be inclined toward the other end side (in the direction of the arrow B) of the body 12.

Next, an end of the tube 14 is inserted onto the guide member 28 from the other end side of the body 12, the tube 14 is moved toward the one end side (in the direction of the arrow A) of the body 12, and the end of the tube 14 is inserted between the guide member 28 and the latching member 30.

In addition, in a state in which the tube 14 is inserted through the tube opening 40, the tightening cap 16 is moved toward the side of the body 12 (in the direction of the arrow A), the female screw portion 44 of the large diameter portion 38 is screw-engaged with respect to the screw threads 32 of the body 12, and by further screw-rotation thereof, the tightening cap 16 is moved (in the direction of the arrow A) toward the side of the stopper 26. As a result, the end of the latching member 30 is pressed by the inner circumferential surface of the tightening cap 16 toward the side of the tube 14, and the claws 36 bite into the outer circumferential surface of the tube 14, thereby latching the tube 14 and preventing detachment thereof.

Figure 3:
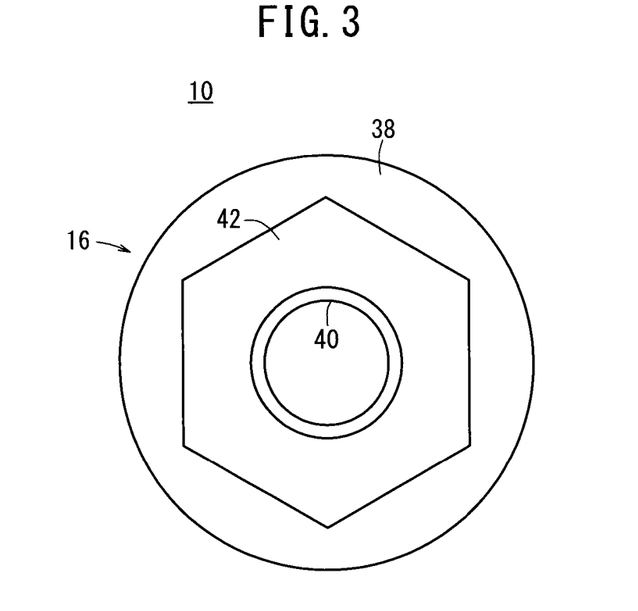
FIG. 3 is a front plan view of the pipe joint of FIG. 1 as seen from another end side thereof.

Further, as shown in FIG. 1, in a state in which the inclined section 50 of the indicator ring 18 does not contact the end of the tightening cap 16, since the outer diameter of the inclined section 50 is formed with substantially the same diameter as the large diameter portion 38, as shown in FIG. 3, when viewed by an operator from the other end of the body 12, the indicator ring 18 cannot be perceived visually. Stated otherwise, the indicator ring 18 is in a completely hidden condition with respect to the large diameter portion 38 of the tightening cap 16.

In addition, by screw-rotating and further moving the tightening cap 16 toward the side of the stopper 26 (in the direction of the arrow A), the protrusion 46 of the tightening cap 16 abuts against the inclined section 50, and the inclined section 50 is pressed gradually toward the side of the stopper 26 (in the direction of the arrow A). Consequently, the inclined section 50 becomes tilted so that the angle of inclination thereof about the junction with the flat section 48 becomes gradually enlarged with respect to the flat section 48 such that the outer diameter of the indicator ring 18 becomes gradually enlarged. Stated otherwise, due to being pressed by the tightening cap 16, the inclined section 50 is tilted into a straight shape together with the flat section 48.

As a result, the inclined section 50 of the indicator ring 18 is deformed so as to project gradually with respect to the outer circumferential surface of the tightening cap 16.

Figure 4:
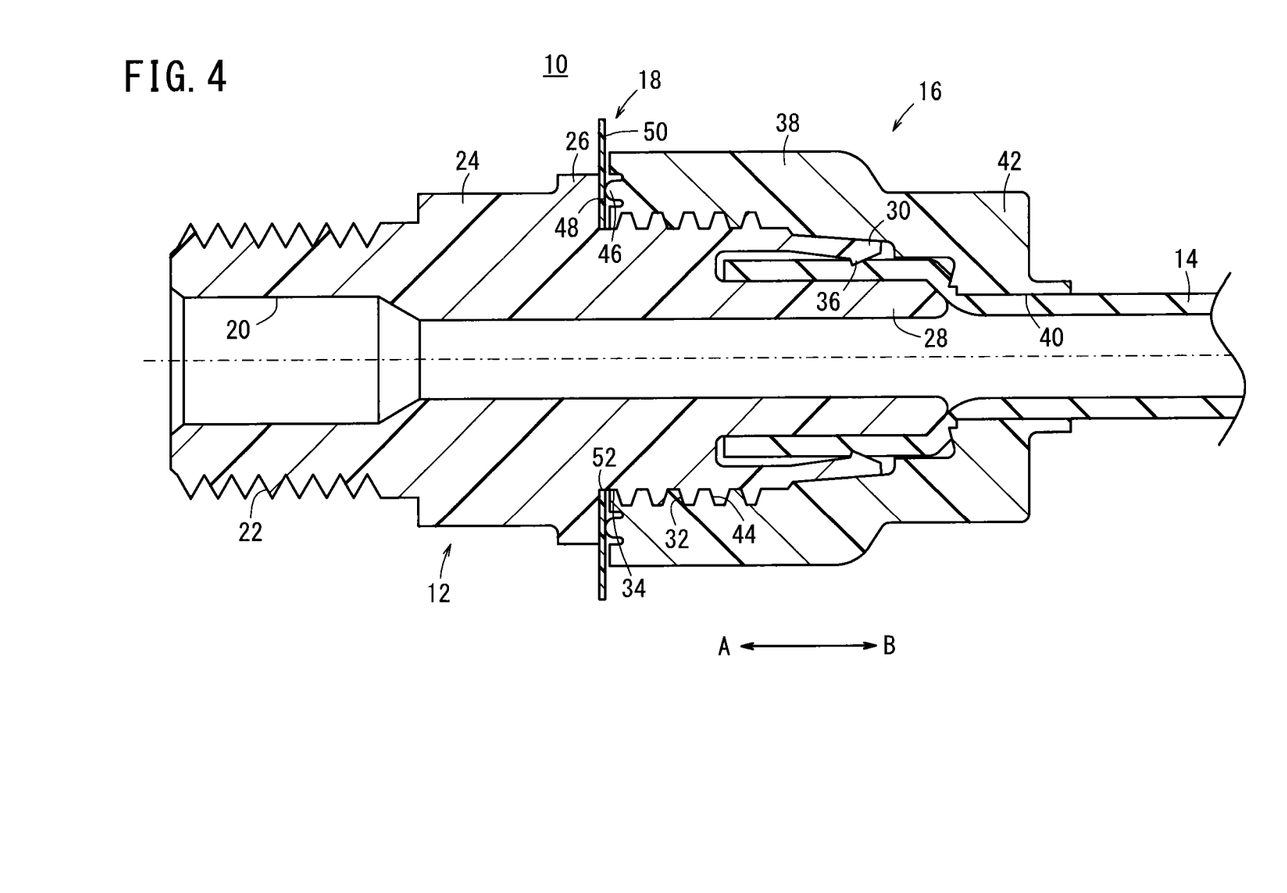
FIG. 4 is an overall vertical cross sectional view showing a condition after the tightening cap has been completely tightened, in the pipe joint of FIG. 1.
Figure 5:
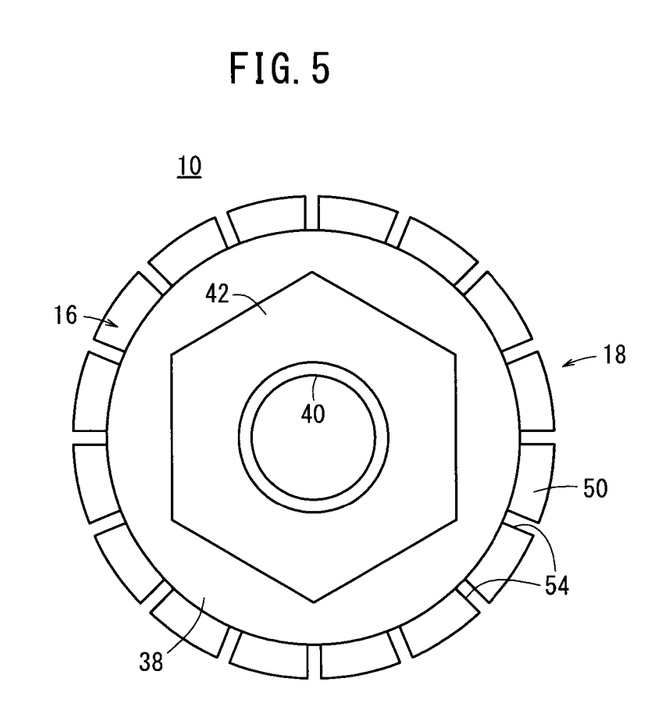
FIG. 5 is a front plan view of the pipe joint of FIG. 4 as seen from another end side thereof.
Figure 6:
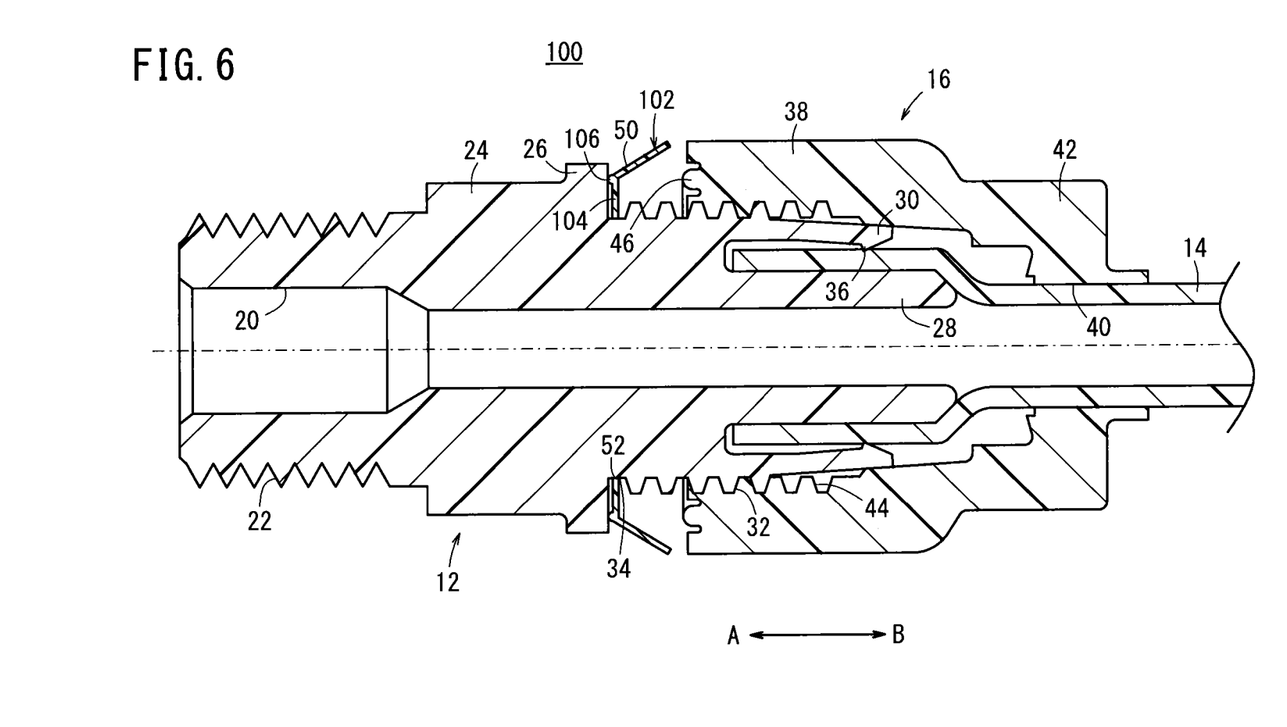
FIG. 6 is an overall vertical cross sectional view showing a state prior to a tightening cap being tightened, in a pipe joint according to a second embodiment of the present invention.

Lastly, as shown in FIG. 4, the inclined section 50 is deformed by the protrusion 46 of the tightening cap 16 until it becomes substantially co-planar with the flat section 48, and a condition is brought about in which, as shown in FIG. 5, the outer edge of the indicator ring 18 projects beyond the outer circumferential surface of the stopper 26. Owing thereto, the tightening cap 16 is screw-engaged completely with respect to the body 12, the tube 14 is reliably connected with respect to the other end of the body 12, and a final state is achieved in which the tube 14 and the fluid passage 20 are placed in communication.

At this time, as shown in FIGS. 4 and 5, the inclined section 50 of the indicator ring 18 extends perpendicularly (in the direction of arrows A and B) to the axis of the body 12 and the tightening cap 16, and projects in a circumferential outward direction beyond the large diameter portion 38 of the tightening cap 16. Thus, as shown in FIG. 5, by visually confirming the indicator ring 18 from the other end side of the body 12, the operator can confirm the condition in which the tightening cap 16 is tightened completely, and the tube 14 is reliably connected with respect to the body 12.

In addition, by connecting the one end of the pipe joint 10, to which the tube 14 has been connected in the foregoing manner, to the port of a non-illustrated fluid pressure device or the like through the screw threads 22, for example, a pressure fluid, which is supplied through the tube 14, can be supplied to the port through the fluid passage 20 of the pipe joint 10.

In this manner, with the first embodiment, when the tube 14 is connected to the body 12 of the pipe joint 10, the indicator ring 18 is disposed on the mounting portion 34 of the body 12, the tightening cap 16, which is screw-engaged with the body 12, is moved, and the inclined section 50 of the indicator ring 18 is pressed and deformed by the end of the tightening cap 16, so that the inclined section 50 is made to project radially outward with respect to the tightening cap 16. As a result, since the tightened condition of the tightening cap 16 with respect to the body 12 can easily and reliably be confirmed visually by the indicator ring 18 projecting outside with respect to the tightening cap 16, the connected condition of the tube 14 by the tightening cap 16 can also be confirmed easily and reliably, and leakage of fluid from between the tube 14 and the body 12 can securely be prevented.

Further, because the tightened condition of the tightening cap 16 with respect to the body 12 can visually be confirmed easily and reliably by the indicator ring 18, workability is improved when the tube 14 is connected through the tightening cap 16. Moreover, each time that the connected condition of the tube 14 is confirmed, troubling and inconvenient operations to confirm the condition of the tightening cap 16 while screw-rotating the same are rendered unnecessary.

Furthermore, by providing the plural slits 54 on the inclined section 50 of the indicator ring 18, the inclined section 50 can be deformed easily and smoothly when pressed by the tightening cap 16, whereby the inclined section 50 can be made to project from the outer circumferential side of the tightening cap 16.

Still further, because the indicator ring 18 including the inclined section 50 is formed as a thin plate from a resin material, pressing and deformation of the inclined section 50 of the indicator ring 18 upon movement of the tightening cap 16 can be carried out with only a slight pressing force when the inclined section 50 is deformed. Therefore, when the inclined section 50 of the indicator ring 18 is deformed, loads that impede movement of the tightening cap 16 do not occur, and the tightening cap 16 can be screw-rotated smoothly to perform the connection operation for the tube 14.

Still further, by painting or coloring the indicator ring 18 in a comparatively bright color such as red or orange, even in a location remote from the pipe joint 10, the operator can easily confirm the state of connection of the tube 14, as well as the tightened condition of the tightening cap 16.

Next, a pipe joint 100 according to a second embodiment is shown in FIGS. 6 through 8B. Structural elements thereof, which are the same as those of the pipe joint 10 according to the first embodiment, are designated using the same reference characters, and detailed descriptions of such features are omitted.

The pipe joint 100 according to the second embodiment differs from the pipe joint 10 according to the first embodiment, in that a projection 106 is provided on the flat section 104 of the indicator ring 102, which abuts against a side surface of the stopper 26 on the body 12.

As shown in FIGS. 6 through 8B, an annular projection 106 is formed on the flat section 104 on a side thereof opposite to the direction of inclination (the direction of arrow B) of the inclined section 50. The projection 106 is formed to project, for example, with a semicircular shape in cross section in the vicinity of the outer edge on the flat section 104.

Figure 7:
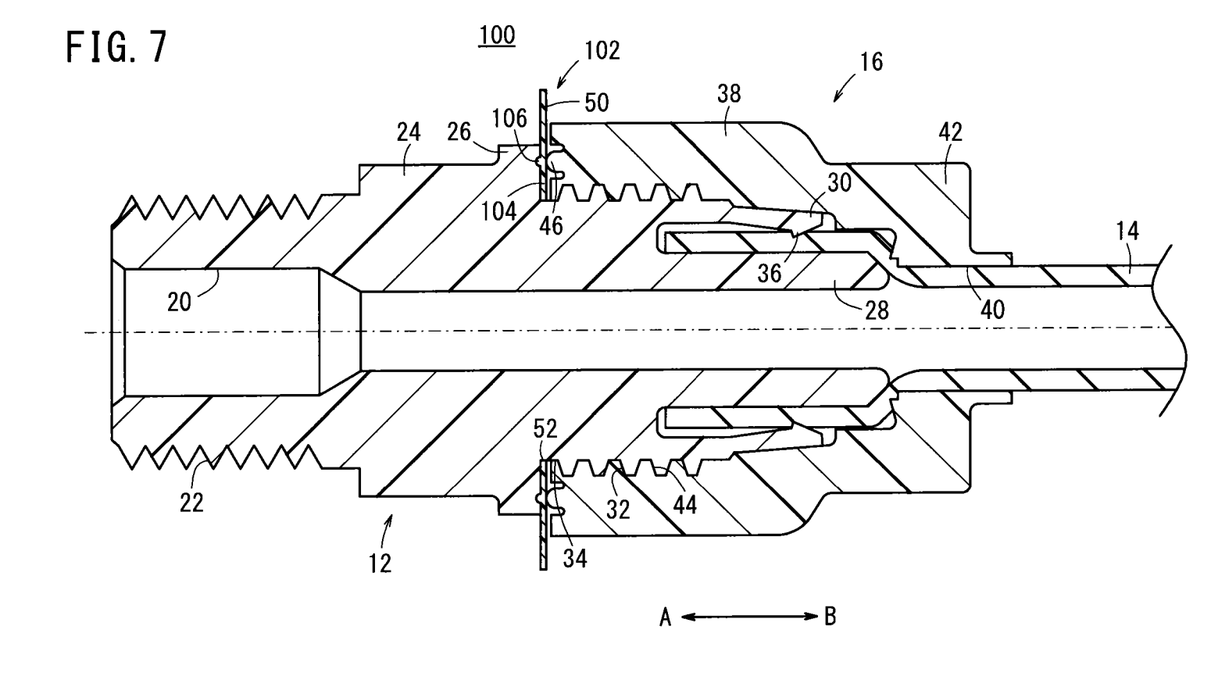
FIG. 7 is an overall vertical cross sectional view showing a condition after the tightening cap has been completely tightened, in the pipe joint of FIG. 6.
Figure 8A:
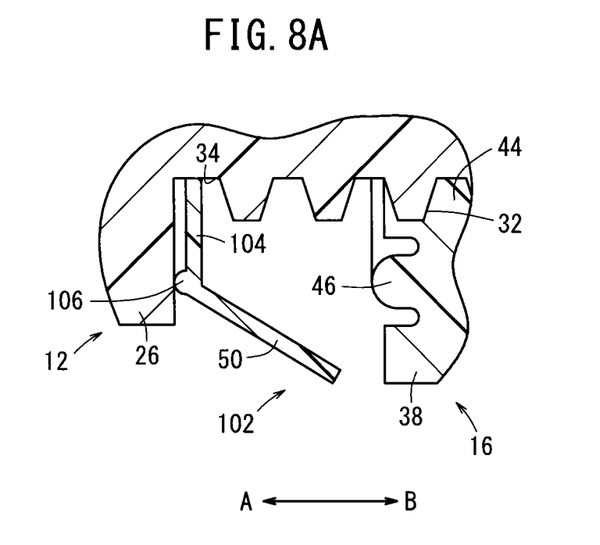
FIG. 8A is an enlarged cross sectional view showing the vicinity of the indicator ring in FIG. 6.
Figure 8B:
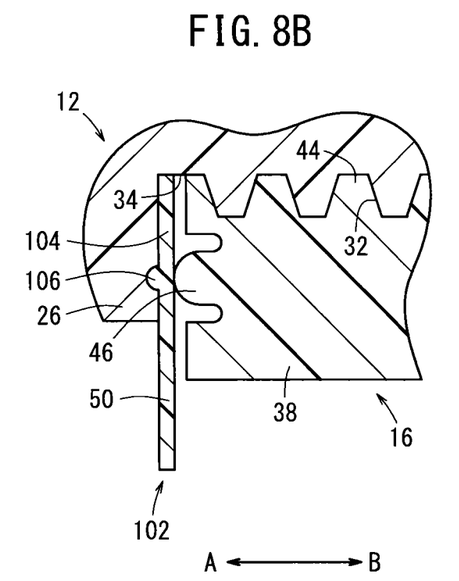
FIG. 8B is an enlarged cross sectional view showing the vicinity of the indicator ring in FIG. 7.

In addition, when the indicator ring 102 is installed on the body 12, the projection 106 abuts against a side surface of the stopper 26, and by tightening the tightening cap 16, the end thereof presses the flat section 104 toward the side of the stopper 26 (in the direction of the arrow A), whereby the projection 106 comes into close contact with respect to the side surface (see FIGS. 7 and 8B). Owing thereto, leakage of pressure fluid from between the body 12 and the flat section 104 of the indicator ring 102 can be prevented more reliably.

Stated otherwise, the projection 106 functions as a sealing means, which is capable of preventing leakage of pressure fluid from between the indicator ring 102 and the body 12.

Figure 9:
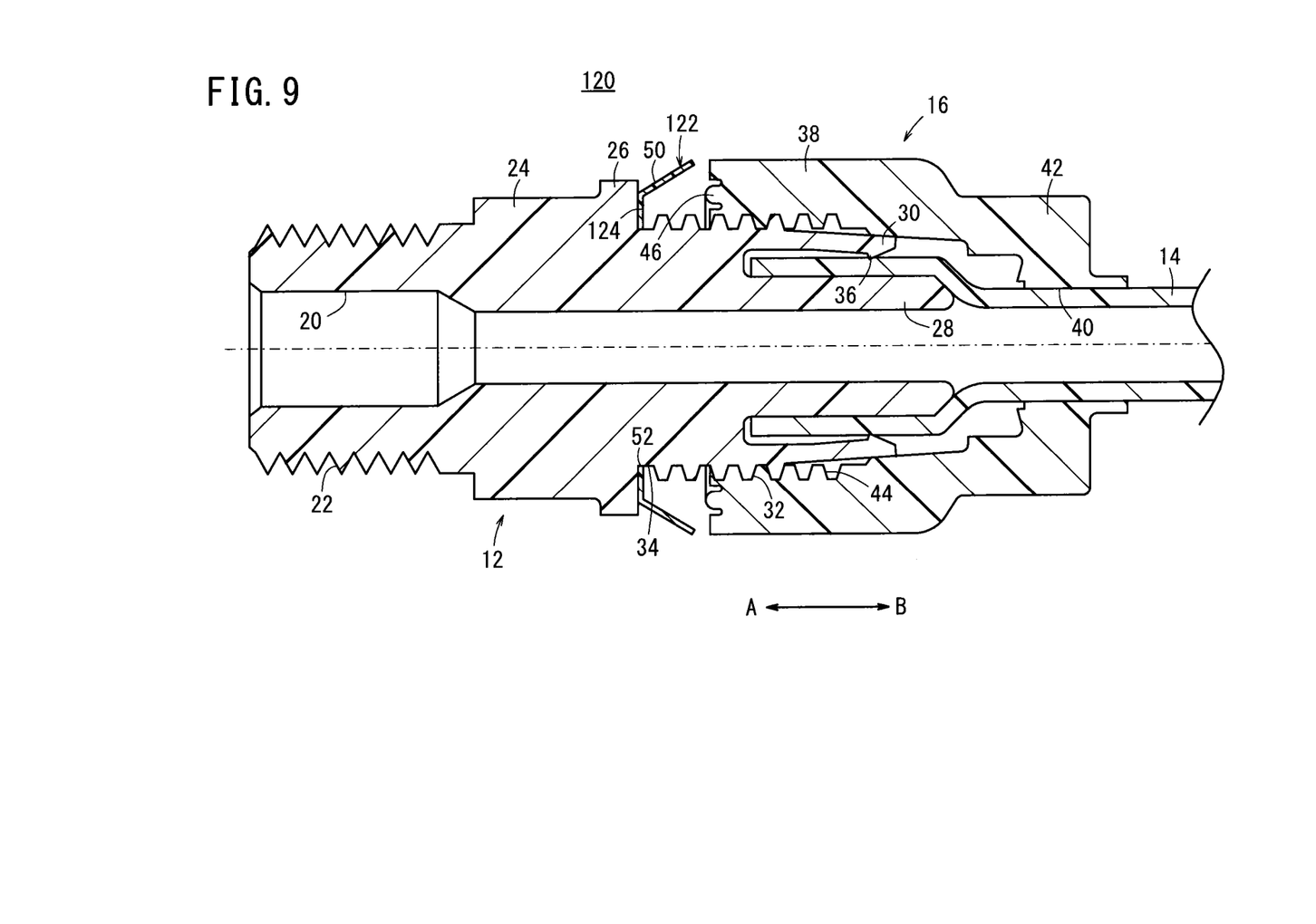
FIG. 9 is an overall vertical cross sectional view showing a state prior to a tightening cap being tightened, in a pipe joint according to a third embodiment of the present invention.
Figure 10:
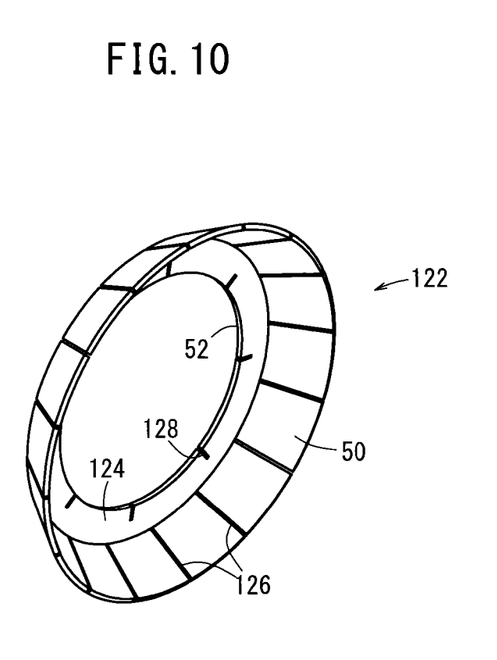
FIG. 10 is an exterior perspective view of an indicator ring that constitutes part of the pipe joint shown in FIG. 9.

Next, a pipe joint 120 according to a third embodiment is shown in FIGS. 9 and 10. Structural elements thereof, which are the same as those of the pipe joint 10 according to the first embodiment, are designated using the same reference characters, and detailed descriptions of such features are omitted.

The pipe joint 120 according to the third embodiment differs from the pipe joint 10 according to the first embodiment, in that a plurality of second slits 128, which extend in a radial outward direction from the opening 52, are provided on the flat section 124 of the indicator ring 122.

As shown in FIGS. 9 and 10, on the indicator ring 122, in addition to the plurality of first slits 126, which extend from the outer edge of the inclined section 50 toward the side of the flat section 124 (in a radial inward direction), a plurality of second slits 128 are provided on the flat section 124 that extend radially outward at a predetermined length from the inner circumferential surface of the opening 52.

The first and second slits 126, 128 are separated mutually along the circumferential direction of the inclined section 50 and the flat section 124. Further, each of the second slits 128 is arranged at a position between two adjacent first slits 126. More specifically, the first slits 126 and the second slits 128 are arranged alternately along the circumferential direction of the indicator ring 122.

In addition, when the indicator ring 122 is installed with respect to the mounting portion 34 of the body 12, the opening 52 is inserted over the other end of the body 12 and is moved toward the side of the stopper 26. At this time, when the opening 52 of the indicator ring 122 passes over the outer peripheral region of the latching member 30 and the screw threads 32 of the body 12, the area around the opening 52 is deformed by the second slits 128 that are provided on the peripheral edge or rim of the opening 52, so as not to become caught on the screw threads 32, whereby the indicator ring 122 can easily and reliably be inserted over and mounted on the mounting portion 34.

More specifically, by providing the plural second slits 128 around the circumferential edge of the opening 52 on the indicator ring 122, the indicator ring 122 can be mounted easily with respect to the mounting portion 34 of the body 12, thereby facilitating the assembly operation.

With the pipe joints 10, 100, 120 according to the above-described first through third embodiments, structures have been described in which the tube 14 is connected with respect to the other end of the body 12. However, the present invention is not limited to this feature. For example, a structure may be provided in which tubes 14 are connected respectively to the one end and the other end of the body 12, and a pair of indicator rings may be provided respectively to enable visual confirmation of the state of connection thereof.

Further, the pipe joint according to the present invention is not limited to the aforementioned embodiments. It is a matter of course that various alternative or additional features and structures could be adopted therein without deviating from the essence and scope of the present invention as set forth in the appended claims.

What is claimed is:
1. A pipe joint comprising:
   a body having a flow passage in an interior thereof through which a fluid flows;
   a tightening member screw-engaged for advancing and retracting movement on an end of the body for connecting a tube, through which the fluid flows, to the end; and
   a visual confirmation ring interposed between an end of the tightening member and the body, the visual confirmation ring having a plurality of slits which are mutually separated along a circumferential direction, the visual confirmation ring becoming exposed to an exterior with respect to the tightening member at a time that the tube is tightened by the tightening member,
   wherein the visual confirmation ring is elastically deformable, and is deformed so that a radially outer circumferential portion of the visual confirmation ring is expanded in diameter by the radially outer circumferential portion being gripped between the tightening member and the body upon movement of the tightening member.

2. The pipe joint according to claim 1, wherein the visual confirmation ring is formed from a resin material.

3. The pipe joint according to claim 1, wherein the visual confirmation ring is colored.

4. The pipe joint according to claim 1, wherein the diameter of the outer circumferential portion of the visual confirmation ring upon deformation thereof is greater than a maximum outer diameter of the body and the tightening member.

5. The pipe joint according to claim 1, wherein the visual confirmation ring comprises:
   a substantially radially extending plate-shaped annular flat section; and
   a plate shaped inclined section provided to a radially outer portion of the annular flat section, which plate shaped inclined section is inclined at an angle from the radial direction and has a larger outer diameter than an outer edge portion of the flat section,
   wherein the inclined section is deformed about a junction thereof with the flat section, and becomes deformed to extend substantially radially and be substantially co-planar with the flat section, as a result of being pressed by the tightening member.

6. The pipe joint according to claim 1, wherein the slits extend radially on the visual confirmation ring to the radially outer circumferential portion of the visual confirmation ring.

7. A pipe joint comprising:
   a body having a flow passage in an interior thereof through which a fluid flows;
   a tightening member screw-engaged for advancing and retracting movement on an end of the body for connecting a tube, through which the fluid flows, to the end; and
   a visual confirmation ring interposed between an end of the tightening member and the body, the visual confirmation ring becoming exposed to an exterior with respect to the tightening member at a time that the tube is tightened by the tightening member,
   wherein the visual confirmation ring is elastically deformable, and is deformed so that a radially outer circumferential portion thereof is expanded in diameter by being gripped between the tightening member and the body upon movement of the tightening member,
   wherein the visual confirmation ring comprises:
   a plate-shaped annular flat section; and
   an inclined section, which is inclined at an angle and expanded in diameter with respect to an outer edge portion of the flat section,
   wherein the inclined section becomes deformed and made substantially co-planar with the flat section as a result of being pressed by the tightening member,
   wherein a plurality of slits, which are mutually separated along a circumferential direction, are provided on the inclined section, the plurality of slits extending from the radially outer circumferential portion of the inclined section toward a side of the flat section.

8. The pipe joint according to claim 7, wherein an opening is included in the center of the flat section, and a plurality of other slits, which are separated mutually along the circumferential direction, are provided that extend from the opening toward a side of the inclined section.

9. The pipe joint according to claim 7, wherein an annular projection, which projects toward the side of the body into abutment with the body, is provided on an end surface of the flat section.

10. The pipe joint according to claim 7, wherein when pressed by the tightening member, the inclined section is inclined about a junction thereof with the flat section.

* * * * *